US006736566B1

(12) United States Patent
Piehl et al.

(10) Patent No.: US 6,736,566 B1
(45) Date of Patent: May 18, 2004

(54) CABLE CONNECTOR RETAINER FOR ANGLED CABLE ASSEMBLY

(75) Inventors: Jason Piehl, Apple Valley, MN (US); Jennifer L. Miller, Farmington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/684,572

(22) Filed: Oct. 6, 2000

(51) Int. Cl.[7] ................................................ F16B 21/00

(52) U.S. Cl. ....................... 403/329; 439/607; 439/350; 403/289; 403/326

(58) Field of Search ................................ 439/357, 298, 439/358, 362, 352, 607, 609, 350, 351; 403/329, 326, 289

(56) References Cited

U.S. PATENT DOCUMENTS

| | | | | |
|---|---|---|---|---|
| 4,558,917 A | | 12/1985 | Kamono et al. | |
| 4,709,975 A | | 12/1987 | Williams, II | |
| 4,971,567 A | | 11/1990 | Mizuno et al. | |
| 5,044,975 A | * | 9/1991 | DiBene, II et al. | 439/357 |
| 5,147,220 A | * | 9/1992 | Lybrand | 439/607 |
| 5,178,557 A | | 1/1993 | Hashiguchi | |
| 5,727,969 A | | 3/1998 | Yamanashi | |
| 6,077,115 A | * | 6/2000 | Yang et al. | 439/607 |
| 6,102,727 A | | 8/2000 | Kawaguchi et al. | |
| 6,113,432 A | | 9/2000 | Liao | |
| 6,116,941 A | * | 9/2000 | Kuo | 439/357 |
| 6,139,366 A | | 10/2000 | van Woensel | |
| 6,168,453 B1 | * | 1/2001 | Kuo | 439/357 |

FOREIGN PATENT DOCUMENTS

| | | |
|---|---|---|
| GB | 1 394 867 | 5/1975 |

OTHER PUBLICATIONS

AMP Catalog No. 82008 dated May 1996, Cover page and p. 13.

12 Color Photographs of assembly believed to be AMP J–Hook Latch as shown in AMP Catalog dated May 1996.

* cited by examiner

*Primary Examiner*—Lynne H. Browne
*Assistant Examiner*—Aaron M Dunwoody
(74) *Attorney, Agent, or Firm*—Merchant & Gould P.C.

(57) ABSTRACT

A retainer for retaining a mating connector in conductive contact with its corresponding mating connector. The retainer includes a base which defines a hole therethrough. A post extends from the base in a direction perpendicular to the base. Disposed on the post is a tapered ledge. The ledge is tapered in a direction away from the base so that the ledge has a first surface at an angle relative to the base. The base may also include a cleat to prevent rotation of the retainer relative to the mating connectors. The cleat is preferably a linear strip extending from and along an edge of the base. The retainer may be used in an assembly including a connector, a mounting bracket and a mating connector.

6 Claims, 5 Drawing Sheets

CABLE CONNECTOR RETAINER FOR ANGLED CABLE ASSEMBLY

FIELD OF THE INVENTION

The present invention relates generally to telecommunications equipment. More particularly, the present invention relates to fasteners for mating connectors used with telecommunications cables.

BACKGROUND OF THE INVENTION

Telecommunications systems commonly include cables which are coupled to telecommunications components and equipment or other cables by means of mating connectors, both male and female. Typically the mating connectors have mounting holes through which the mating connectors may be secured by means of a screw or similar fastener to one another or to an intervening frame.

Some mating connectors, such as 25 pair Telco or Amp connectors which include multiple conductive wire pairs and contact points aligned in a linear array, often include connector hoods which collect and guide the wire pairs away from the mating connector in a common direction. The hoods are commonly referred to by the angle toward which they lead the wires away from the mating connectors. For example a 180° connector hood leads the wires in a direction 180° from the direction perpendicular to the linear array of wire pairs and contact points (straight back from the mating connector). A 90° connector hood leads the wires in a direction parallel to the linear array of wire pairs and contact points.

When a connector hood other than a 180° connector hood is used, it becomes difficult to secure the mating connectors together using two screws because one of the holes in the mating connector is blocked by the connector hood or cable. If the mating connectors are not secured on both ends, the mating connectors may become disconnected resulting in loss of signal transmission. Therefore, there is a need for an easily installed mechanism for retaining the mating connector in conductive contact with its corresponding mating connector where the fastener mounting hole is blocked or partially obstructed by an angled connector hood or other object.

SUMMARY OF THE INVENTION

The present invention relates to a retainer for retaining a mating connector in conductive contact with its corresponding mating connector. The retainer includes a base which defines a hole therethrough. A post extends from the base in a direction perpendicular to the base. Disposed on the distal end of the post is a tapered ledge. The ledge is tapered in a direction away from the base so that the ledge has a flat first surface at an angle relative to the base, and a second surface facing the base. The base may also include a cleat to prevent rotation of the retainer relative to the mating connectors. The cleat is preferably a linear strip extending from and along an edge of the base. The retainer may be used in an assembly including a connector, a mounting bracket and a mating connector.

DETAILED DESCRIPTION OF THE PREFERRED EMBODIMENT

In the following detailed description, references are made to the accompanying drawings that depict an embodiment of in which the invention may be practiced. It is to be understood that other embodiments may be utilized, and structural and functional changes may be made without departing from the scope of the invention.

The present invention relates to a retainer tab for holding a connector, such as a 25 pair Telco or Amp connector, in conductive contact with its mating connector where it is inconvenient to use a screw or similar fastener. This situation typically arises where screw holes in the connector are obstructed or completely blocked by the hood, cable or wires leading into the connector. As will be described below, a retainer may be fixed to one of the connectors or to a mounting bracket before the connector is coupled its mating connector. When the two connectors are then coupled, the retainer prevents the connectors from separating without the use of a fastener through the end of the connector retained by the retainer.

Referring now to FIGS. 1–5, a retainer 10 according to the present invention is shown. The retainer 10 includes a planar base 12 which defines a hole 14 for receiving a screw or other fastener. Since the retainer must fit between two mating connectors without preventing conductive contact between the two connectors, the profile of the base 12 preferably is thin. Therefore, the main portion of the base 12 is planar to minimize its height.

From the base 12 extend two support posts 16. The two posts 16 extend perpendicularly from the base 12. Preferably the support posts 16 as well as the entire retainer 10 are made from plastic. Plastic allows the posts 16 to bend sufficiently so that the connectors may be easily inserted and separated without damaging the retainer 10 or the connectors.

Figure 3:
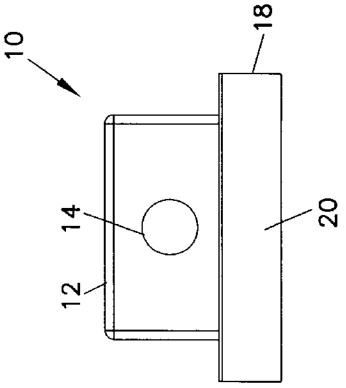
FIG. 3 is a top view of the retainer of FIG. 1.
Figure 2:
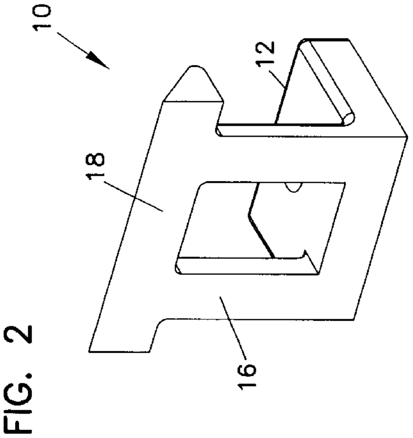
FIG. 2 is a rear perspective view of the retainer of FIG. 1.
Figure 1:
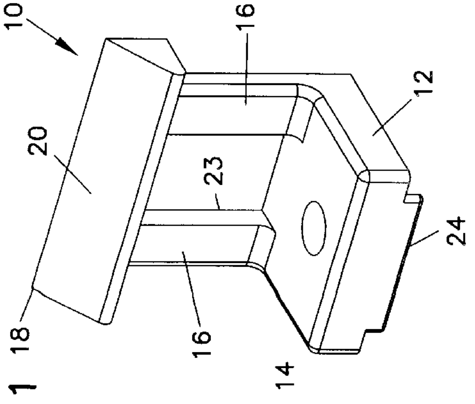
FIG. 1 is a front perspective view of a retainer according to the present invention.
Figure 5:
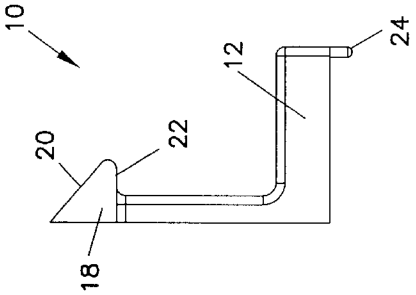
FIG. 5 is a side view of the retainer of FIG. 1.
Figure 4:
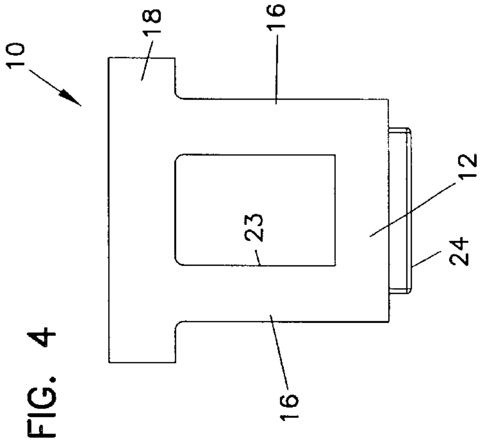
FIG. 4 is a rear view of the retainer of FIG. 1.

Disposed on one end of the support posts 16 is a tapered ledge 18. As best seen in FIGS. 1, 2 and 5, the ledge 18 is tapered in a direction away from the base 12 so as to create in the ledge 18 a receiving or ramped surface 20 which is at an angle relative to the base 12. The receiving surface 20 of the ledge 18 is angled so that the connector to be retained by the retainer 10 may be easily pushed into a retained position relative to the retainer 10. That is, as a portion of the connector to be retained slides against the receiving surface 20 of the ledge 18, the posts 16 may flex away from the connector until the connector achieves the desired location at which point the posts return to their un-flexed position. The ledge 18 also includes an overhanging ledge or shoulder surface 22 shown in FIG. 5 which extends from the posts 16. The ledge surface 22 acts to retain a connector in close proximity to the base 12 of the retainer 10. An aperture 23 may receive an end of the connector retained by the retainer 10.

Extending from a bottom side of the base 12 is a cleat 24. The preferred cleat 24 is linear and extends along the edge of the base 12. The cleat 24 is designed to prevent rotation of the cleat 24 relative to the connectors being retained.

Figure 6:
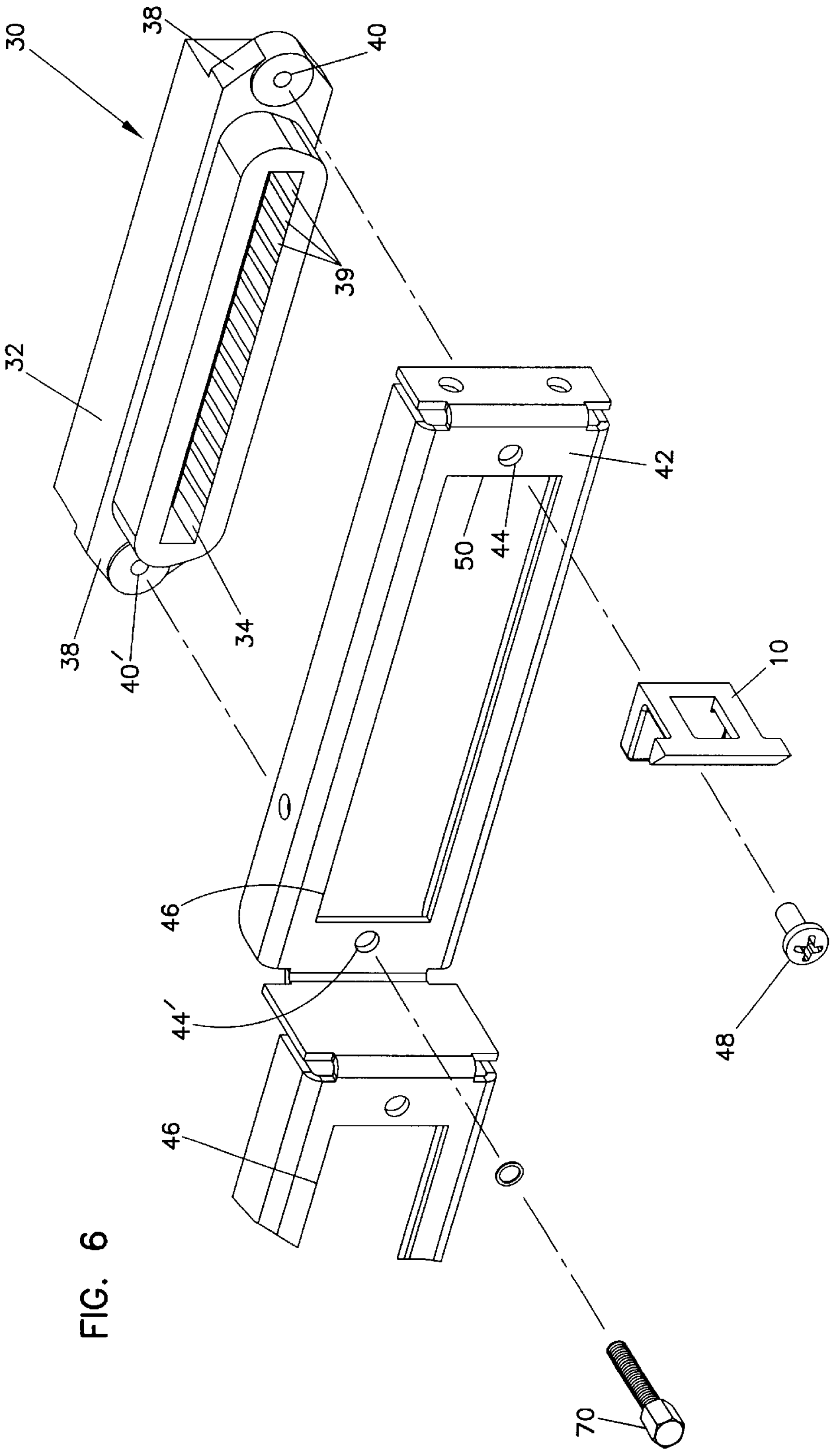
FIG. 6 is an exploded view of a connector assembly according to the present invention.

FIG. 6 shows an assembly 30 incorporating a retainer 10 according to the present invention. The assembly 30 includes a female connector 32. The female connector 32 defines a receptacle 34 for receiving a portion of a mating, male connector 36 (shown in FIGS. 7 and 8). The female connector 32 typically will have multiple pairs of conductive contacts 39 located inside the receptacle 34. For a 25 pair Telco or Amp connector, there are 25 pairs of opposed contacts 39 to mate with contacts of the male connector. On either side of the receptacle 34 are tabs 38 which define connector holes 40 for receiving a screw or other similar fastener.

The assembly 30 in FIG. 6 includes a mounting bracket 42. The mounting bracket 42 defines a bracket window 46 for receiving the connector 32. The mounting bracket 42 may include a number of bracket windows 46 for mounting an array of connectors 32 to a frame. On either side of the window 46 the bracket 42 defines a bracket hole 44. The bracket holes 44 are spaced to overlap the connector holes 40 of the connector 32 when the connector 32 is received by the window 46.

Retainer 10 is secured to the mounting bracket 42 by means of screw 48 which passes through the retainer hole 14. The screw 48 then passes through the mounting bracket 42 and into the connector hole 40 of the female connector 32. Therefore, screw 48 secures the retainer 10 to one side of the mounting bracket 42 and simultaneously secures the female connector 32 to an opposite side of the mounting bracket. The mounting bracket 42 preferably is made of thin sheet metal.

Cleat 24 of the retainer 10 extends into the bracket window 46 of the mounting bracket 42 along a linear side 50 of the window 46. The linear cleat 24 abuts the side 50 of the window 46 to prevent rotation of the retainer 10 relative to the mounting bracket 42 and connector 32.

Figure 7:
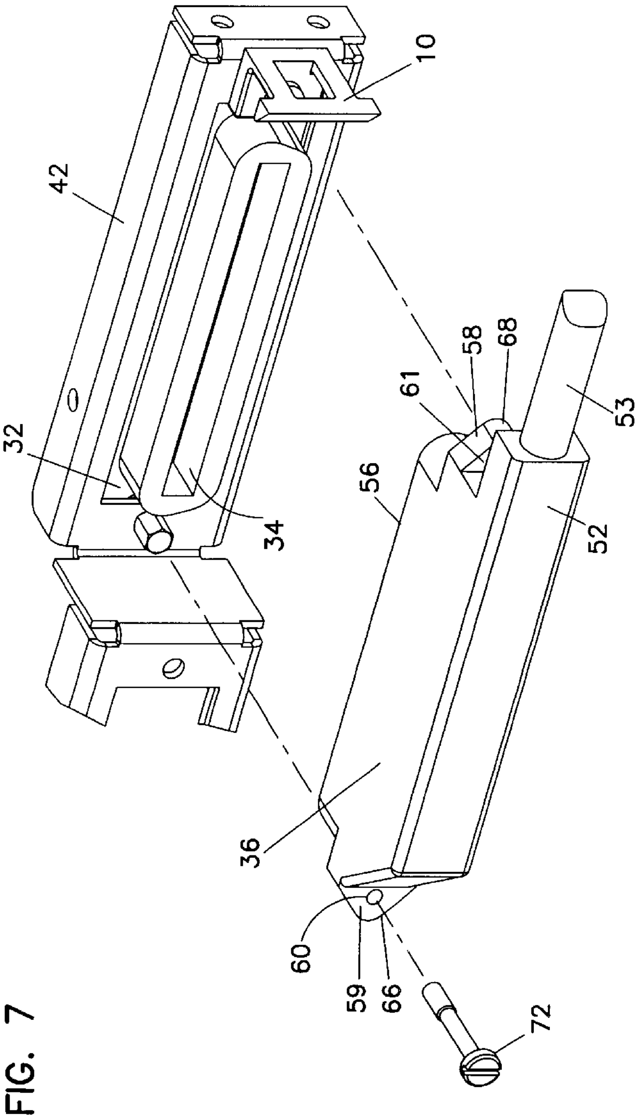
FIG. 7 is an exploded view of a connector assembly according to the present invention incorporating a 90° connector hood.
Figure 8:
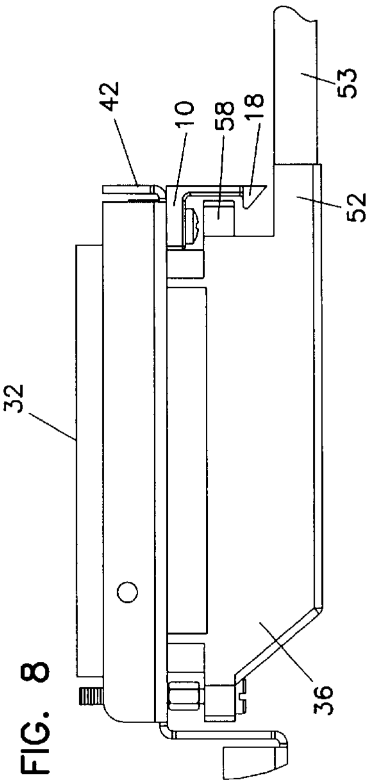
FIG. 8 is a top view of the connector assembly of FIG. 7.
Figure 9:
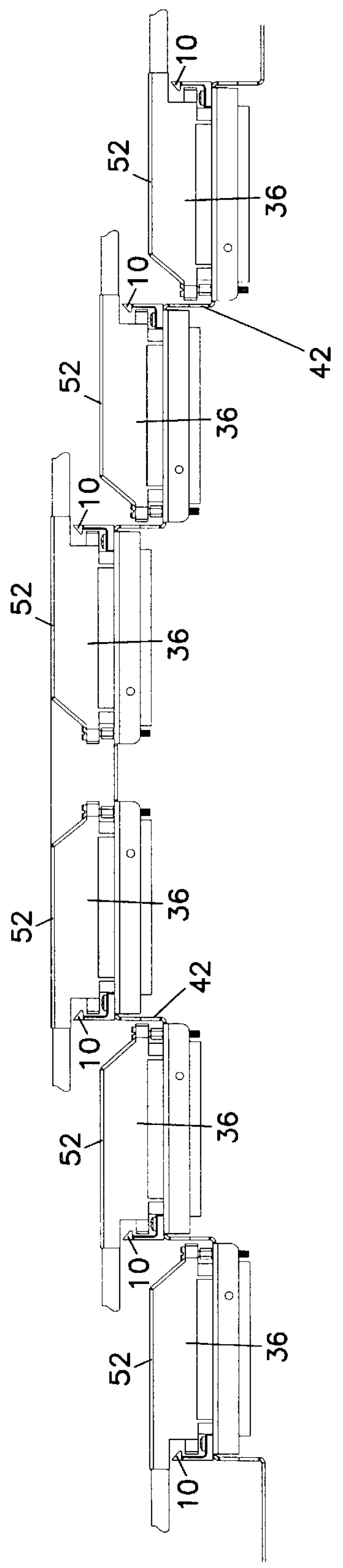
FIG. 9 is a schematic top view of a connector panel with angled cable assemblies.
Figure 12:
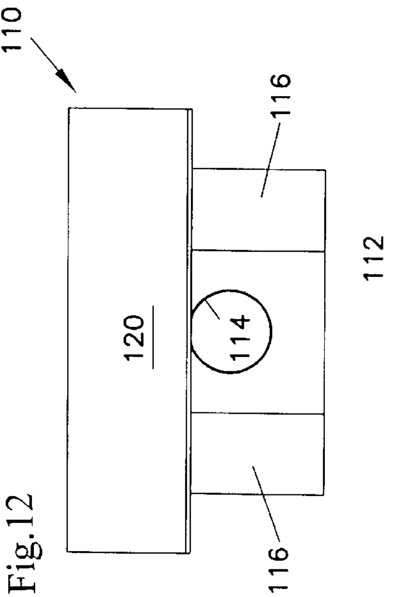
FIG. 12 is a top view of the retainer of FIG. 10.
Figure 11:
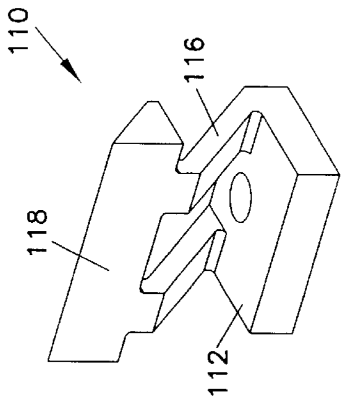
FIG. 11 is a rear perspective view of the retainer of FIG. 10.
Figure 14:
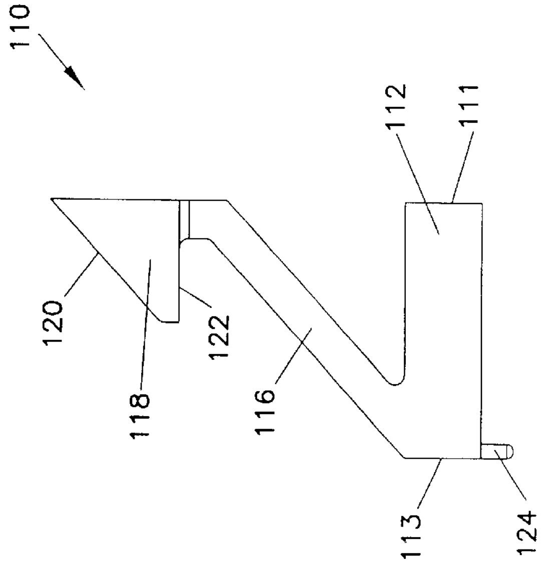
FIG. 14 is a side view of the retainer of FIG. 10.
Figure 10:
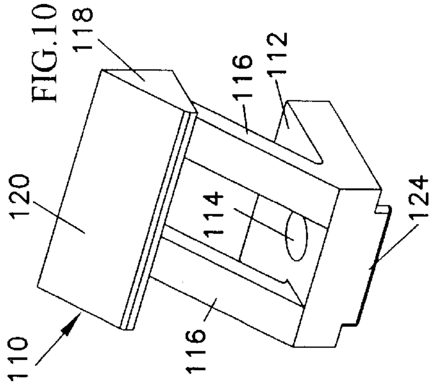
FIG. 10 is a front perspective view of a retainer according to a second embodiment of the present invention.
Figure 13:
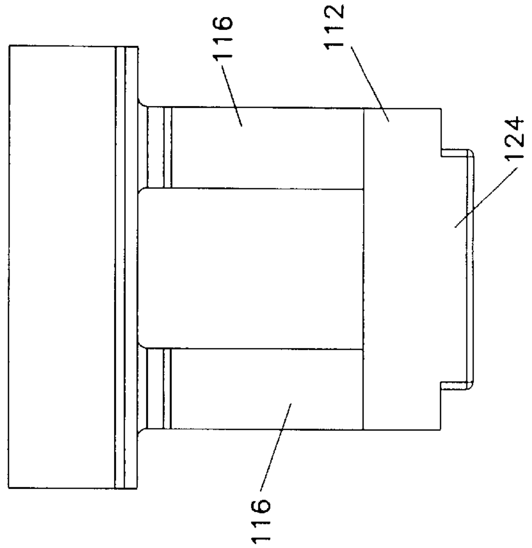
FIG. 13 is a rear view of the retainer of FIG. 10.

Referring now to FIGS. 7 and 8, a mating, male connector 36 is shown having a 90° connector hood 52 and cable 53. The bracket windows 46 are offset in the example shown. The use of the 90° connector hoods 52 allows the cables 53 to avoid interference with each other, yet remain densely packed. The male connector typically has a linear array of conductive contacts (not shown) within a mating portion 56 of the connector. The conductive contacts are received by the receptacle 34 of the female connector 32. The connector hood 52 guides and collects wires from the conductive contacts into the cable 53. A schematic panel or chassis 43 is shown in FIG. 9 in top view with two mounting brackets 42 for connectors 36 and cables 53. Panel 43 may include one or more rows of connectors 36 and cables 53 above and below the row shown in the schematic view.

Mating connector 36 includes mounting tabs 58 and 59. Mounting tabs 58 and 59 define mounting holes 60 and 61. The mounting holes 60 and 61 are spaced to overlap the connector holes 40 in the female connector 32. However, because of connector hood 52, mounting hole 61 is obstructed. Using a screw through mounting hole 61 is awkward and difficult.

By using retainer 10, however, the mating connector 36 can be secured to the mounting bracket 42 and connector 32 at both ends 66 and 68 without placing a screw through mounting hole 61. End 68 of mating connector 36 is retained by means of the retainer 10. As shown in FIG. 8, end 68 of the mating connector 36 is retained such that mating connector remains in conductive contact with connector 32 by capturing mounting tab 58 under the ledge 18 of the retainer 10.

End 66 via mounting tab 59 may be secured to the mounting bracket 42 and connector 32 using a screw or other simple fastener in the usual manner. Alternatively a standoff screw 70 may be used through hole 40' and bracket hole 44' to secure the connector 32 to the mounting bracket 42. Then an additional screw 72 may be used to secure end 66 of mating connector 36 to the mounting bracket 42.

Having described the present invention in its preferred embodiments, modifications and equivalents may occur to one skilled in the art. It is intended that such modifications and equivalents shall be included within the scope of the claims which are appended hereto.

What is claimed is:

1. A retainer for securing a mating cable connector to its corresponding mating cable connector, the retainer comprising:

- a base having a first face and a second face opposite the first face, the base defining a hole for receiving a fastner between the first and second faces;
- a first post and second post extending from the base;
- a tapered ledge disposed on the posts, the ledge being tapered in a direction away from the base so that the ledge has a first ramp surface at an angle relative to and facing away from the base, the ledge having a second surface facing the base to retain the corresponding mating connector; and
- a linear cleat extending from the base in a direction away from the posts and parallel to the tapered ledge.

2. The retainer of claim 1 wherein the base has a first side and a second side opposite the first side; and further wherein the cleat is a linear strip along an edge of the first side of the base, and wherein the posts are disposed on the second side of the base.

3. The retainer of claim 1 wherein the posts are plastic.

4. The retainer of claim 1 wherein the posts extend from the first face of the base and wherein the cleat extends from the second face of the base and wherein the second face of the base is flat except for the cleat.

5. The retainer of claim 2 wherein the posts extend from the first face of the base and wherein the cleat extends from the second face of the base and wherein the second face of the base is flat except for the cleat.

6. The retainer of claim 1 wherein the posts are perpendicular relative to the base.

* * * * *